(12) United States Patent
Nguyen et al.

(10) Patent No.: US 7,724,479 B2
(45) Date of Patent: May 25, 2010

(54) METHOD AND APPARATUS FOR AN AUXILIARY MASS DAMPER IN EACH ACTUATOR ARM NOTCH OF A HARD DISK DRIVE

(75) Inventors: Tu Nguyen, San Jose, CA (US); Tho Pham, Milpitas, CA (US); Myeong-Eop Kim, Sunnyvale, CA (US)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 921 days.

(21) Appl. No.: 11/502,054

(22) Filed: Aug. 9, 2006

(65) Prior Publication Data
US 2008/0037178 A1    Feb. 14, 2008

(51) Int. Cl.
*G11B 5/55*    (2006.01)

(52) U.S. Cl. ............... 360/265.9; 360/97.02; 360/98.01
(58) Field of Classification Search ............. 360/97.02, 360/244.2–244.9, 265.7–266.1, 98.01
See application file for complete search history.

(56) References Cited

U.S. PATENT DOCUMENTS 6,091,574 A * 7/2000 Misso ................. 360/265.9

* cited by examiner

*Primary Examiner*—A. J. Heinz
(74) *Attorney, Agent, or Firm*—GSS Law Group

(57) ABSTRACT

Actuator arm includes an island coupling through a mote to at least two of actuator base, first and second actuator arm bridge. Head stack including at least one actuator arm. Head stack assembly including head stack. Hard disk drive including head stack assembly. Manufacturing methods for actuator arm, head stack, head stack assembly, and hard disk drive, and the products of these processes.

21 Claims, 8 Drawing Sheets

METHOD AND APPARATUS FOR AN AUXILIARY MASS DAMPER IN EACH ACTUATOR ARM NOTCH OF A HARD DISK DRIVE

TECHNICAL FIELD

This invention relates to the actuator arms used in a head stack in the hard disk drive, in particular their handling of mechanical shocks.

BACKGROUND OF THE INVENTION

Contemporary hard disk drives include an head stack assembly pivoting through an actuator pivot to position one or more read-write heads, embedded in sliders, each over a rotating disk surface. The data stored on the disk surface is typically arranged in concentric tracks. To access the data of a track, a read-write head is positioned by electrically stimulating the voice coil motor, which couples through the voice coil and an actuator arm to move a head gimbal assembly in positioning the slider close to the track.

Currently, a prior art actuator arm 52 tends to include an actuator notch 52Notch made from an actuator arm base 52Base coupling through a first actuator arm bridge 52A1 and a second actuator arm bridge 52A2, which join together to hold the swage site 52S as shown in FIG. 1A. Conventional wisdom dictates that the actuator notch is useful in reducing the mass of the actuator arm, which retaining sufficient rigidity to perform its purpose of holding a head gimbal assembly over a rotating disk surface to access a track.

There is a problem with this situation. When a mechanical shock is transmitted through the prior art actuator arm, it slowly decays, as shown in FIG. 2A. This is the kind of mechanical shocks experienced when a hard disk drive is bumped or dropped, a common phenomena, particularly in hand held devices such as portable music players, digital cameras, handheld computers and notebook computers. An improved actuator arm, no thicker than its contemporaries, is needed that can minimize actuator arm movement during mechanical shocks.

SUMMARY OF THE INVENTION

The invention's actuator arm includes an island coupling through a mote to at least two members of the group consisting of: an actuator base, a first actuator arm bridge, and a second actuator arm bridge; wherein the actuator arm is for use in a hard disk drive. The inventors found that using mechanical simulation software tool with the same materials and shapes for the rest of the actuator arm, an embodiment of the actuator arm showed much better response to a mechanical shock than the prior art actuator arm shown.

The island may couple through the mote to each of the actuator base, the first actuator arm bridge and the second actuator arm bridge. The mote may be composed of a single connected component, or multiple separate connected components. The mote may or may not surround the island.

The island may not couple through the mote to each of the actuator base, the first and the second actuator arm bridge, for example, the coupling through the mote may be to the first and second actuator arm bridges, but not to the actuator base.

The invention includes manufacturing the actuator arm, preferably from an actuator arm blank including the actuator notch formed by the actuator base, the first and second actuator arm bridges, by providing the island in the notch and providing the mote coupling the island to at least two of the actuator base, the first and second actuator arm bridges. The invention further includes the actuator arm as a product of this process.

The invention includes a head stack including at least one of the invention's actuator arms. The head stack may include more than one of these actuator arms, and preferably only these actuator arms.

The invention includes manufacturing the head stack by using the method of manufacturing the actuator arm on each of the actuator arms concurrently to create the head stack. Put another way, manufacturing the head stack includes providing the island in an actuator notch between the actuator base, the first actuator arm bridge and the second actuator arm bridge and providing the mote coupling the island to at least two of the members of the group to create the actuator arm, for each actuator arm included in the head stack. Providing the mote may further include injecting a self-adhesive rubber to create the mote. The self-adhesive rubber may include a man-made plastic and/or a processed natural product.

The invention includes a head stack assembly, which includes the invention's head stack coupled to at least one head gimbal assembly, further coupling the actuator arm to at least one head gimbal assembly, for each of the actuator arms included in the head stack. At least one actuator arm may couple to two head gimbal assemblies. Manufacturing the head stack assembly preferably includes coupling the actuator arm to at least one head gimbal assembly, for each actuator arm included in the head stack, to create the head stack assembly. The invention includes the head stack assembly as a product of this manufacturing process.

The invention's hard disk drive includes the invention's head stack assembly mounted through its actuator pivot to a disk base. Manufacturing the hard disk drive preferably includes mounting the head stack assembly through its actuator pivot to the disk base to create the hard disk drive. The invention includes the hard disk drive as a product of the invention's manufacturing process.

DETAILED DESCRIPTION

This invention relates to the actuator arms used in a head stack in the hard disk drive, in particular their handling of mechanical shocks. The invention's actuator arm includes an island coupling through a mote to at least two of an actuator base, a first actuator arm bridge, and a second actuator arm bridge; wherein the actuator arm is for use in a hard disk drive. The inventors found that using mechanical simulation software tool with the same materials and shapes for the rest of the actuator arm, an embodiment of the actuator arm showed much better response to a mechanical shock than the prior art actuator arm shown.

The actuator arm 52 includes an island 52I coupled through a mote 52M to at least two of an actuator base 52Base, a first actuator arm bridge 52A1, and a second actuator arm bridge 52A2, as shown in FIGS. 1B to 1F, 3 and 4A. The mote is preferably composed of a self-adhesive rubber and/or plastic, and the island may be composed of a metal, often preferred to be a non out-gassing metal such as a form of stainless steel. The actuator arm is preferably manufactured by providing the island coupling through the mote to at least two of the actuator base, the first actuator arm bridge and/or the second actuator arm bridge. Providing this may preferably be achieved through injection molding. The actuator arm is the product of this process.

The island may couple through the mote to each of the actuator base, the first actuator arm bridge and the second actuator arm bridge. The mote may be composed of a single connected component, or multiple separate connected components. The mote may or may not surround the island. The island may not couple through the mote to each of the actuator base, the first and the second actuator arm bridge, for example, the coupling through the mote may be to the first and second actuator arm bridges, but not to the actuator base.

Figure 1A:
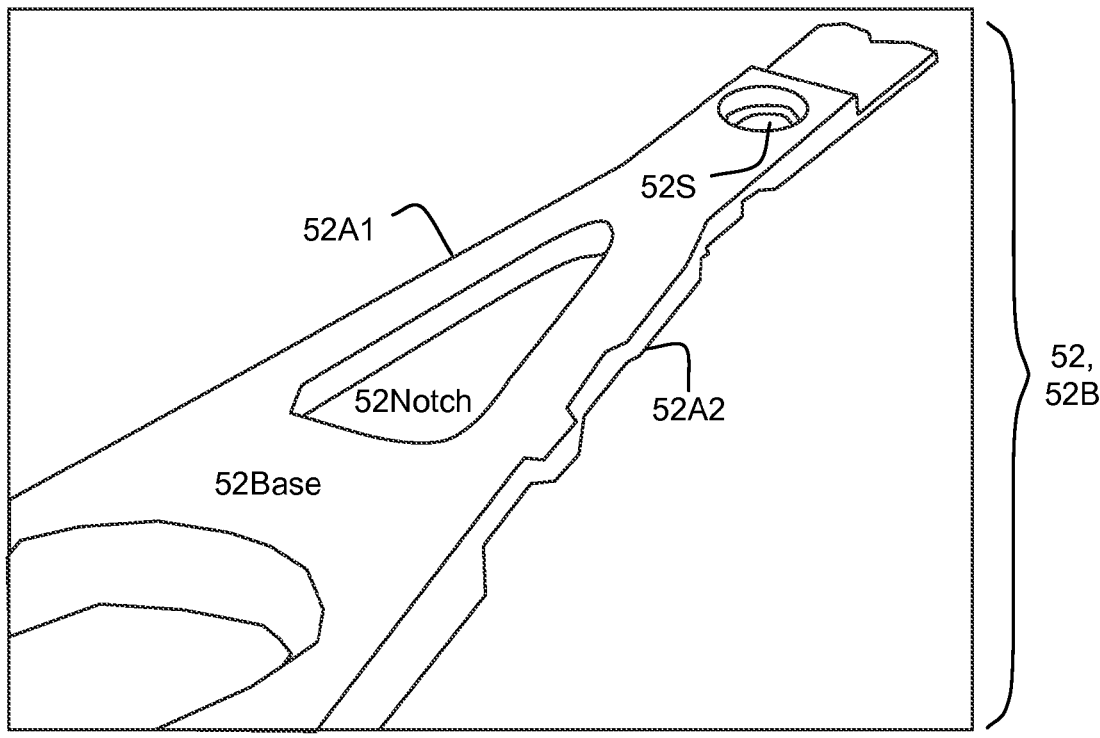
FIG. 1A shows the prior art actuator arm.
Figure 1B:
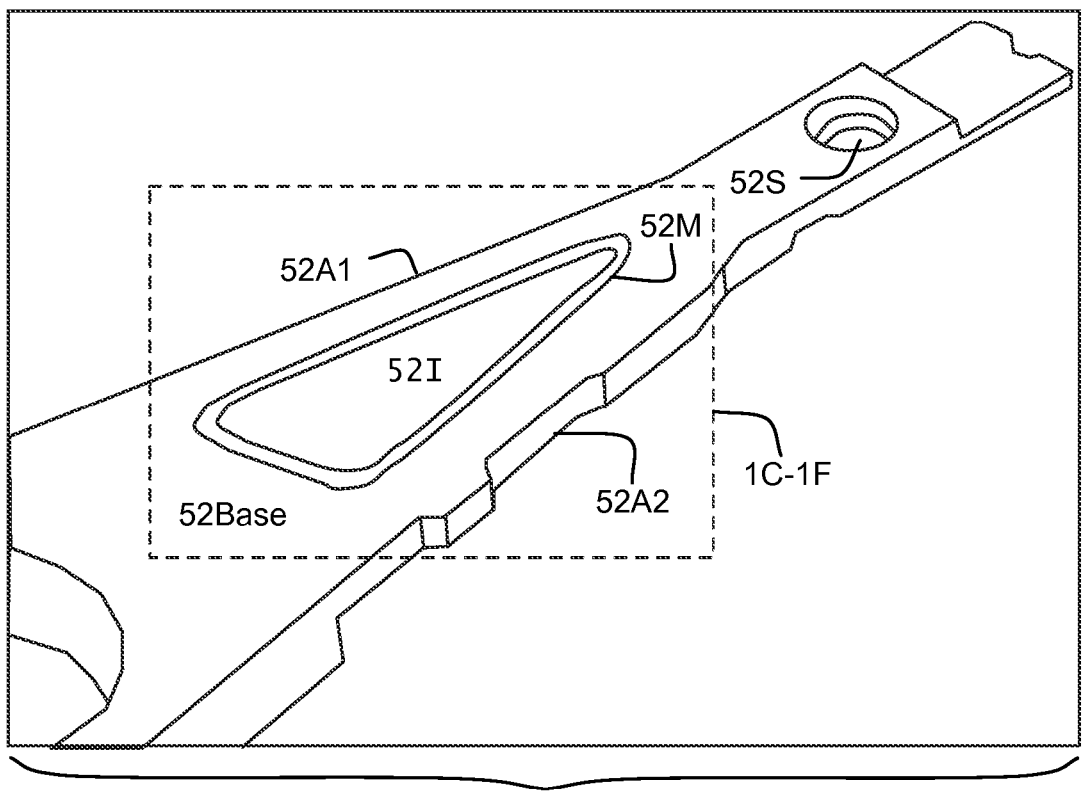
FIGS. 1B and 1C show the invention's actuator arm with its island and mote.

FIG. 1B shows the general relationship between the island 52I coupling through the mote 52M to at least two of the actuator base 52Base, the first actuator arm bridge 52A1 and the second actuator arm bridge 52A2. FIGS. 1C to 1F show various alternative embodiments, which are provided as examples of various embodiments and not as an exhaustive catalog.

Figure 1C:
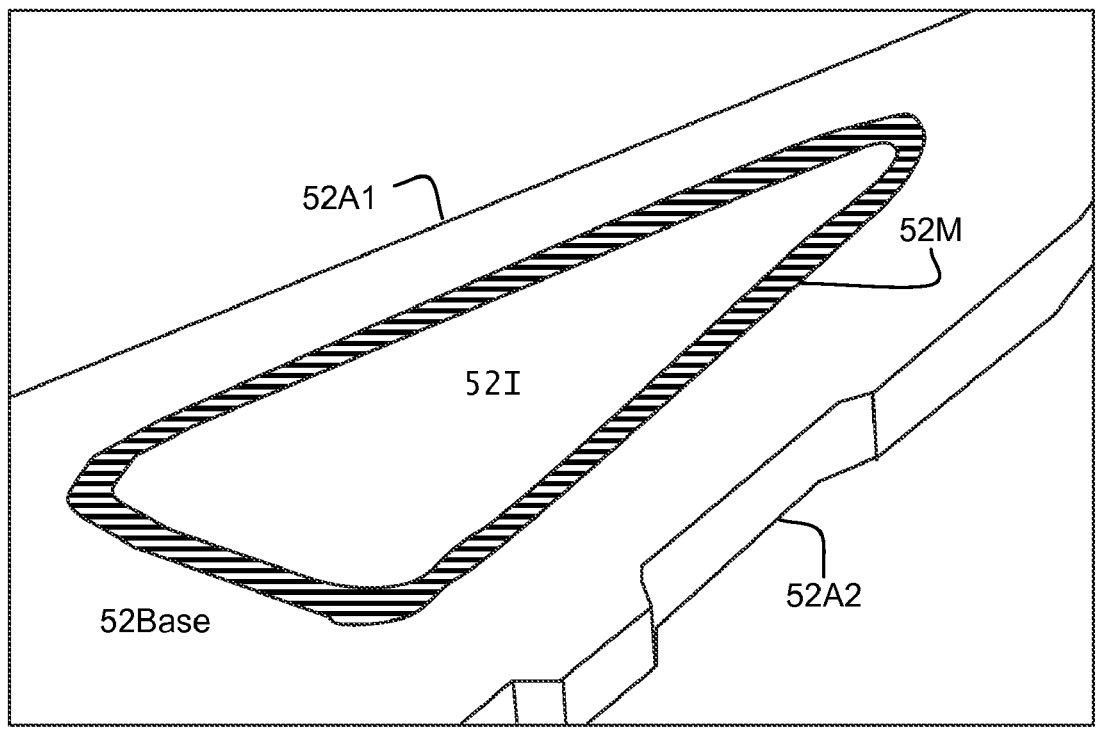
Figure 2A:
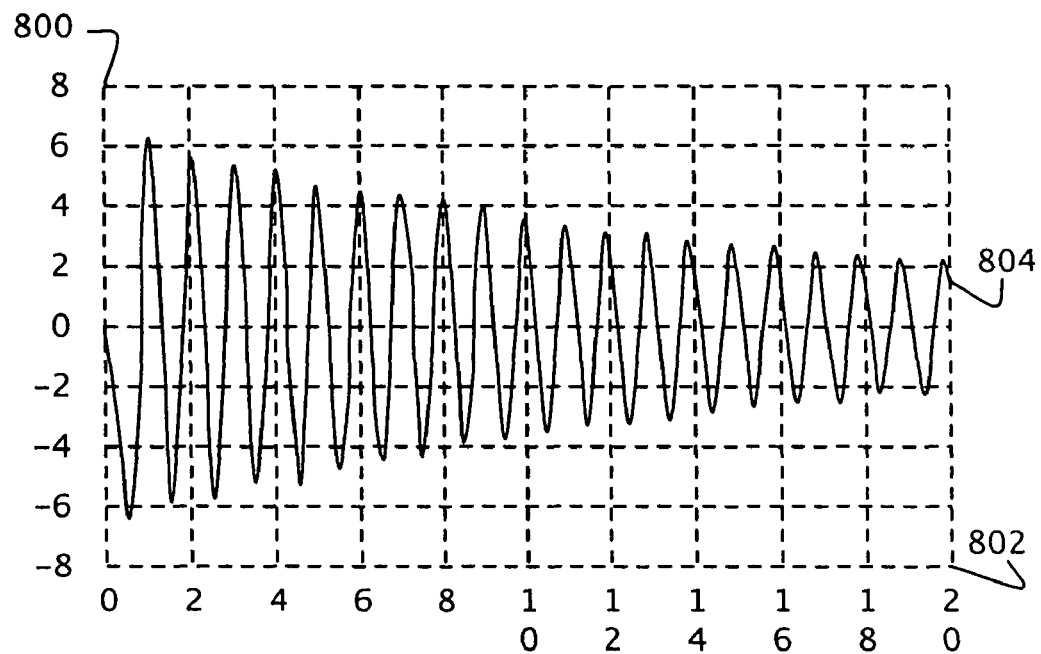
FIG. 2A shows the mechanical response of prior art actuator arm of FIG. 1A to a mechanical shock.
Figure 2B:
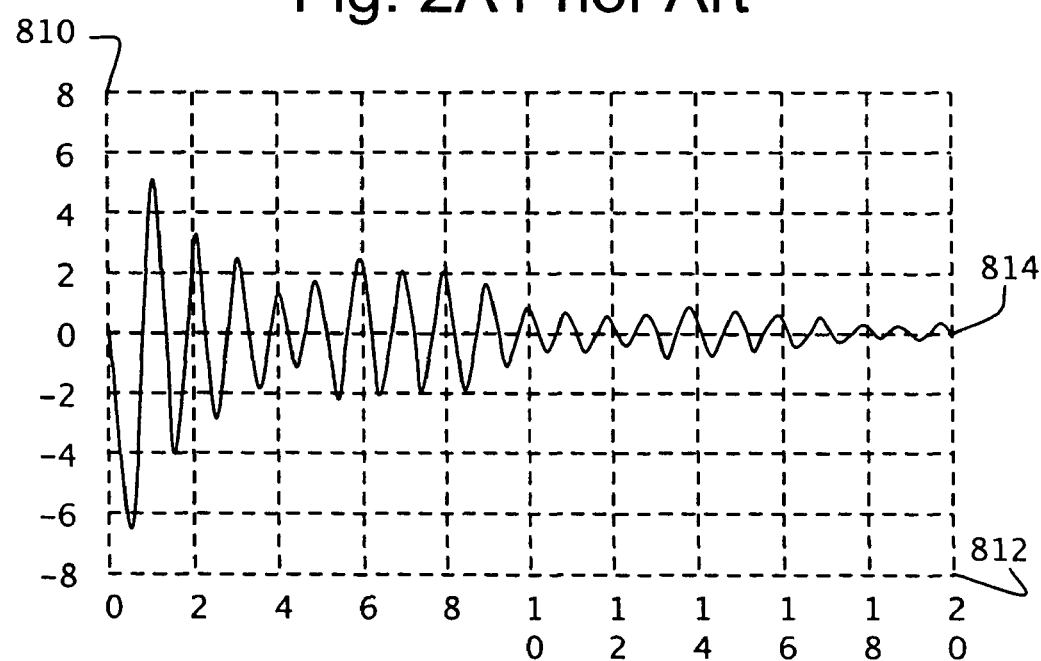
FIG. 2B shows the invention's actuator arm's response to the same shock, showing significant dampening of the mechanical response.

FIG. 1C shows the island 52I coupling through the mote 52M to each of the actuator base 52Base, the first actuator arm bridge 52A1 and the second actuator arm bridge 52A2. The inventors found that using the same mechanical simulation software tool with the same materials and shapes for the rest of the actuator arm, this embodiment of the invention's actuator arm 52 showed much better response to a mechanical shock than the prior art actuator arm shown FIG. 1A. The mechanical response of the prior art actuator arm is shown as trace 804 in FIG. 2A, with the horizontal axis 802 representing time measured in milliseconds and the vertical axis 800 representing displacement of the read-write head 94 as measured in micro-meters. The mechanical response of the invention's actuator arm is shown as trace 814 in FIG. 2B, with the horizontal axis 812 representing time measured in milliseconds and the vertical axis represented displacement of the read-write head in micro-meters. Note that the invention's actuator arm reaches the same worst case displacement in about 8 milliseconds compared to the prior art's actuator arm in 20 milliseconds. This represents a significant improvement in the response to mechanical shock.

Figure 1D:
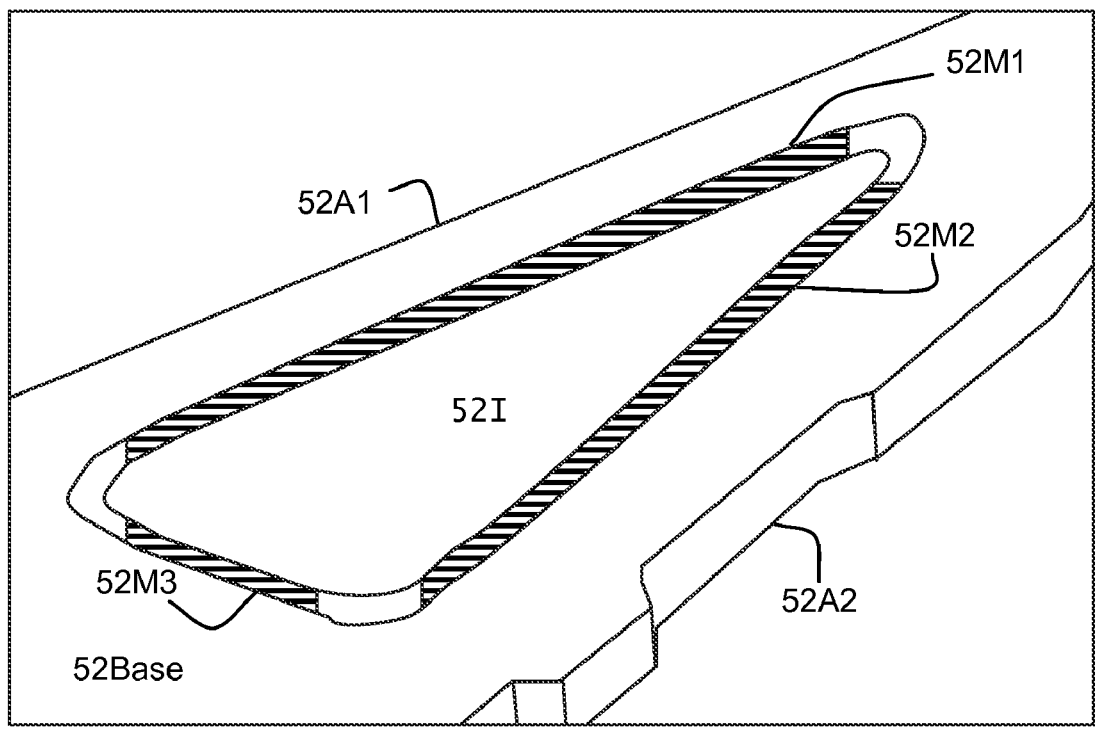
FIG. 1D shows an actuator arm with just a mote.

FIG. 1D shows alternative to the actuator arm 52 of FIG. 1C including the island 52I coupling through the mote 52M to each of the actuator base 52Base, the first actuator arm bridge 52A1 and the second actuator arm bridge 52A2. In this embodiment, the mote is formed of a first mote component 52M1, a second mote component 52M2 and a third mote component 52M3, each of which is a separate connected component.

Figure 1E:
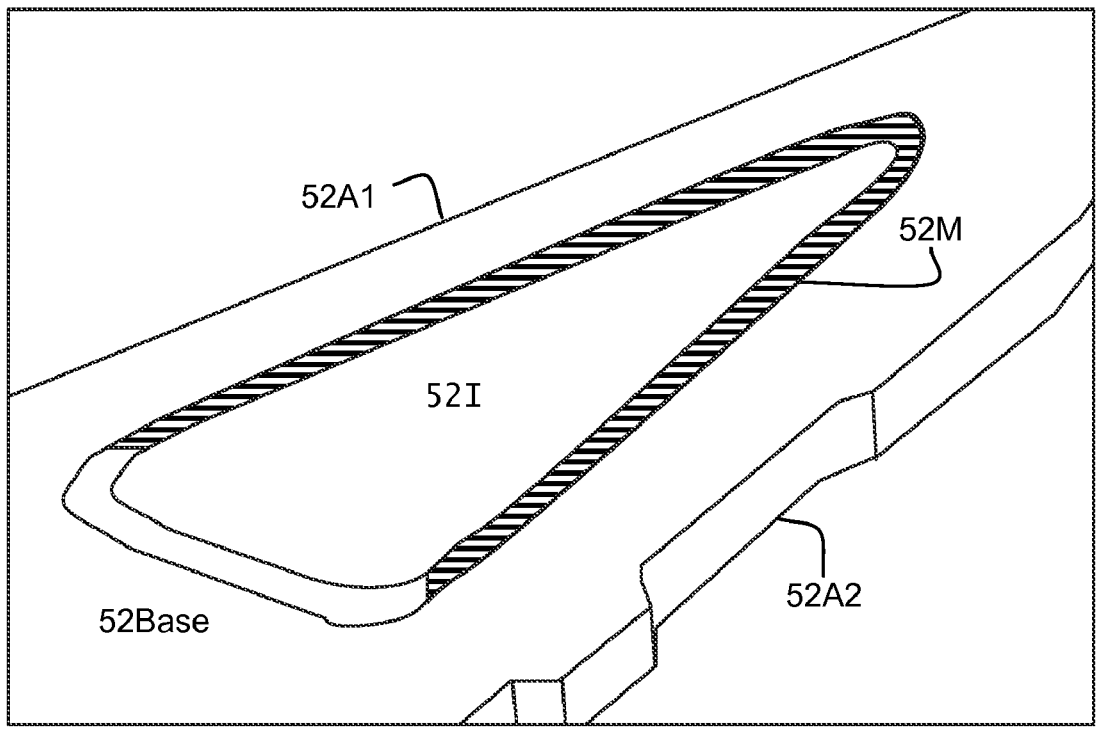
FIG. 1E shows an alternative to the actuator arm of FIG. 1C with the mote formed of three separate connected components.

FIG. 1E shows another embodiment of the actuator arm 52 of FIG. 1B including the island 52I coupling through the mote 52M to each of the first actuator arm bridge 52A1 and the second actuator arm bridge 52A2, and not coupling to the actuator base 52Base.

Figure 1F:
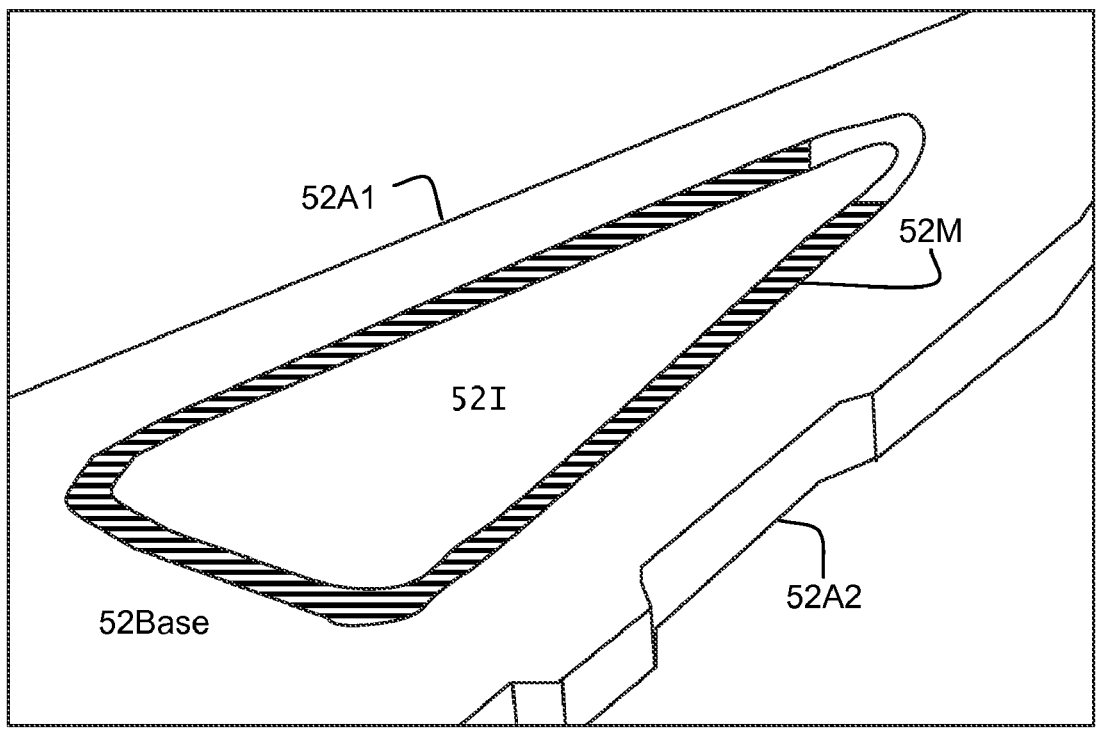
FIG. 1F shows another embodiment of the actuator arm of FIG. 1C including the island coupling through the mote to the first and second actuator bridges but not to the actuator base.

FIG. 1F shows alternative to the actuator arm 52 of FIG. 1C including the island 52I coupling through the mote 52M to each of the actuator base 52Base, the first actuator arm bridge 52A1 and the second actuator arm bridge 52A2. In this embodiment, the mote is formed of a just one connected component, but does not surround the island as it does in FIG. 1C.

The invention includes manufacturing the actuator arm 52, preferably from an actuator arm blank 52B including the actuator notch 52Notch formed by the actuator base 52Base, the first actuator arm bridge 52A1 and the second actuator arm bridge 52A2, by providing the island 52I in the actuator notch and providing the mote 52M coupling the island to at least two of the actuator base, the first and second actuator arm bridges. The invention further includes the actuator arm as a product of this process.

Figure 3:
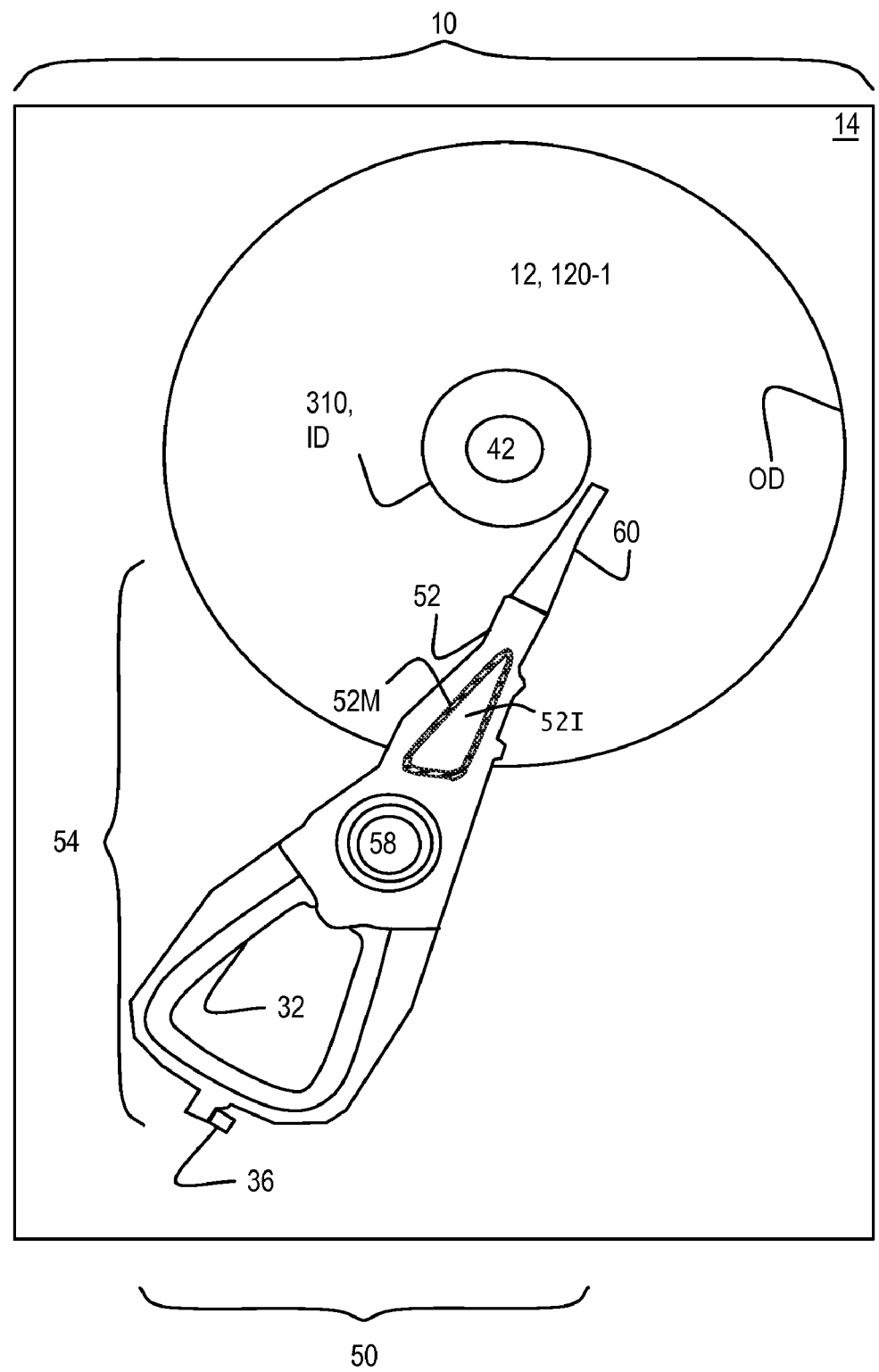
FIGS. 3 to 4B show some details of the invention's head stack, head stack assembly, voice coil motor and hard disk drive.
Figure 4A:
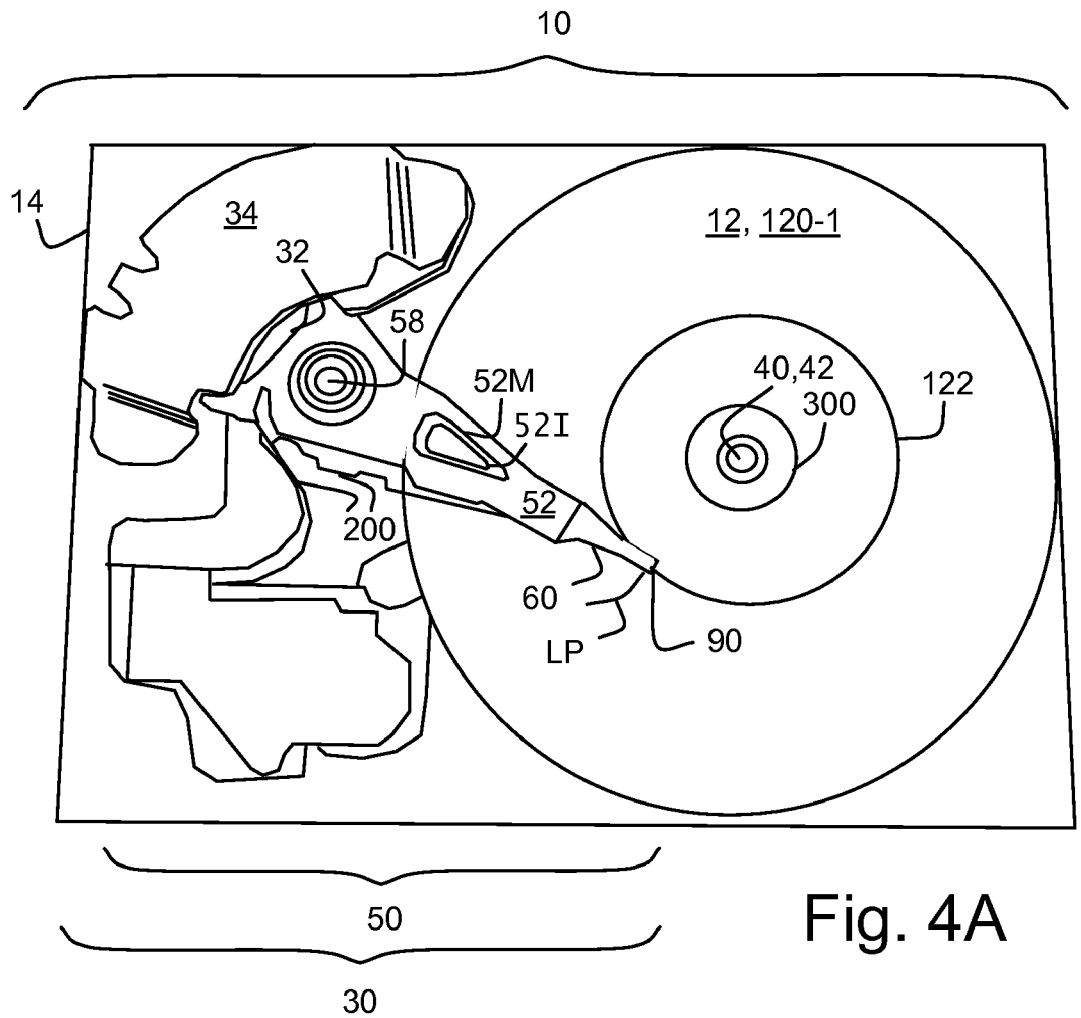
Figure 4B:
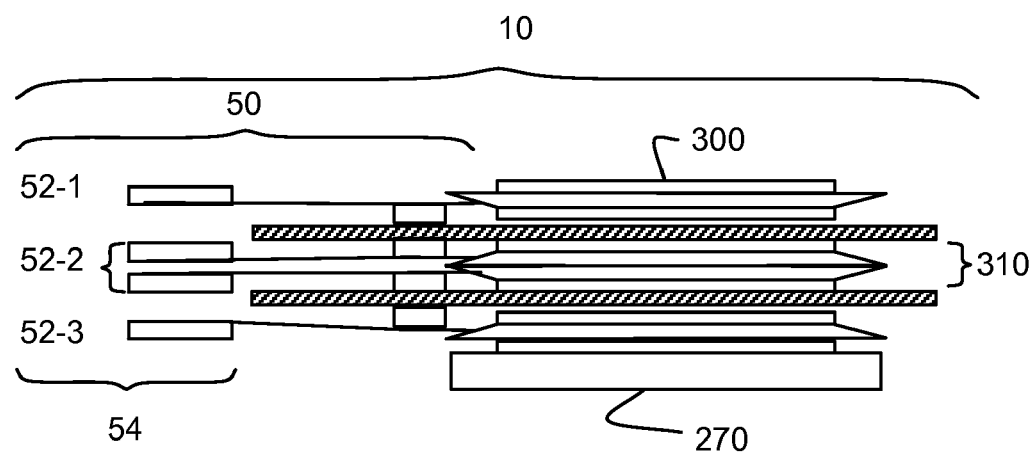

The invention includes a head stack including at least one of the invention's actuator arms. The head stack may include more than one of these actuator arms, and preferably only these actuator arms. The head stack 54 includes at least one of the invention's actuators coupled to a voice coil 32, as shown in FIGS. 3 to 4B. The head stack may include exactly one actuator arm. Alternatively, the head stack may include more than one actuator arm, for example, FIG. 4B shows the head stack including a first actuator arm 52-1, a second actuator arm 52-2, and a third actuator arm 52-3.

The invention includes manufacturing the head stack 54 by using the method of manufacturing the actuator arm on each of the actuator arms concurrently to create the head stack. Put another way, manufacturing the head stack includes providing the island 52I in an actuator notch 52Notch between the actuator base 52Base, the first actuator arm bridge 52A1 and the second actuator arm bridge 52A2 and providing the mote 52M coupling the island to at least two of the actuator base, the first and the second actuator arm bridges, to create the actuator arm, for each actuator arm included in the head stack. Providing the mote may further include injecting a self-adhesive rubber to create the mote. The self-adhesive rubber may include a man-made plastic and/or a processed natural product.

Manufacturing the head stack 54 may include casting a head stack blank with each actuator arm 52 including an actuator notch 52Notch, as shown in FIG. 1A, and then providing an island coupling through the mote in the actuator notch to create the inventions actuator arm, for each actuator arm of the head stack. Providing the islands coupling through the motes may include placing the island and then injecting the self-adhesive rubber, which may be seen as a form of injection molding. The invention includes the head stack as a product of this process.

The invention's head stack assembly 50, which includes the invention's head stack 54 coupled to at least one head gimbal assembly 60, further coupling the actuator arm 52 to at least one head gimbal assembly, for each of the actuator arms included in the head stack, as shown in FIGS. 3 to 4B. At least one actuator arm may couple to two head gimbal assemblies.

Figure 5A:
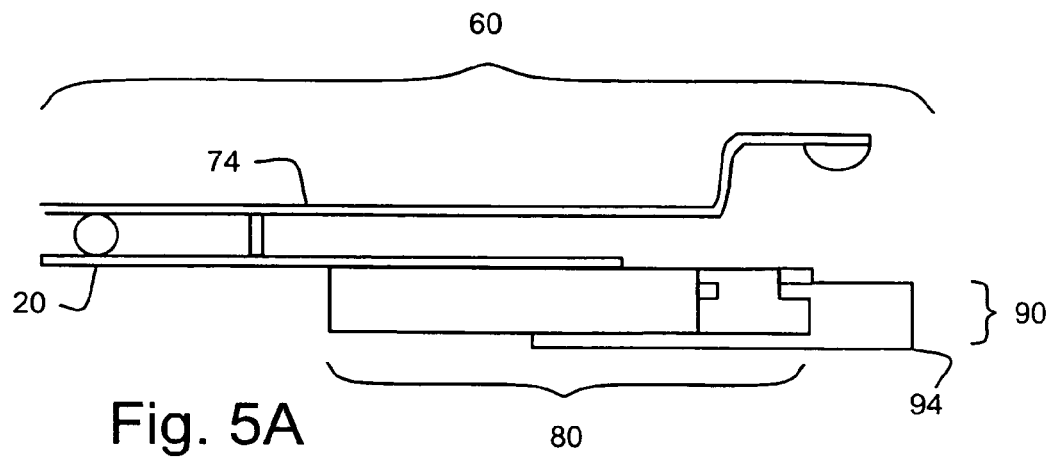
FIGS. 5A and 5B show some details of head gimbal assemblies which can be used with the invention's head stack, coupling to the invention's actuator arm.
Figure 5B:
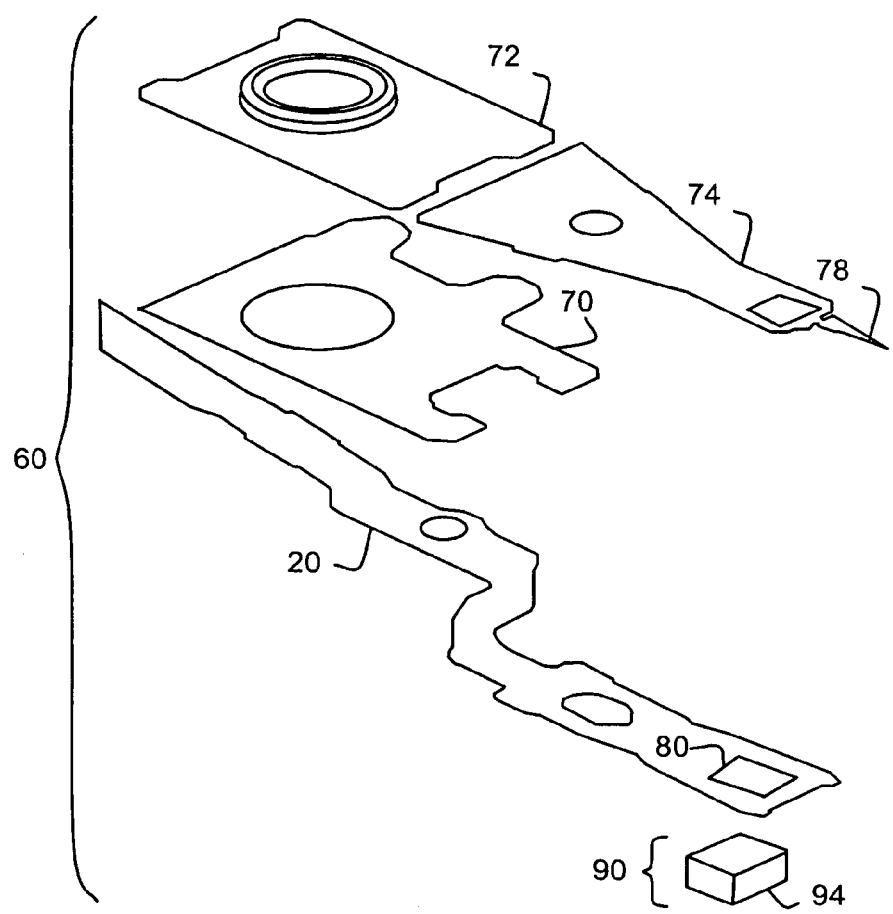

The head gimbal assembly 60 is shown in some detail in FIGS. 5A and 5B including the slider 90 coupled through a flexure finger 20 to a load beam 30, which couples through a hinge 70 to a base plate 72. The slider includes the read-write head 94, which is embedded in it, forming an air-bearing surface for flying a few nano-meters off the disk surface 120-1 during normal access operations of a track 122, which is usually arranged as a concentric circle on the disk surface in the hard disk drive 10 as shown in FIG. 4A. The head gimbal assembly may further include a micro-actuator assembly 80 coupling to the slider to aid in the lateral positioning LP of the read-write head in accessing the track. Since the slider may further include a vertical micro-actuator, which is used to provide some control of the vertical position of the slider above the disk surface. Since the vertical micro-actuator is not directly related to the actuator arms, it is not shown in these Figures. The micro-actuator assembly and/or the vertical micro-actuator may employ a thermal-mechanical effect and/ or a piezoelectric effect and/or an electrostatic effect.

The hard disk drive 10 may park its slider 90 on the disk surface 120-1 as a contact start-stop (CSS) hard disk drive or on a ramp off the disks. The head gimbal assembly may include a load tab 78, which in CSS hard disk drives, may be used in contact with a tab ramp formed in a disk clamp 300, a disk spacer 310, and/or a spindle motor 270 to create a secure contact with the disk surface, as shown in FIG. 4B. The load tab may be used with the ramp off the disks as well.

Returning to the head stack assembly 50 includes at least one actuator arm 52, and as shown, may include additional actuator arms 52-2 and 52-3. The actuator arm 52 may couple with more than one head gimbal assembly 60. By way of example, the second actuator arm 52-2 may preferably include the second head gimbal assembly 60-2 and the third head gimbal assembly 60-3. Such an actuator arm may be preferred to minimize manufacturing expense. The second actuator arm preferably accesses two rotating disk surfaces, as shown in FIG. 4B.

Manufacturing the head stack assembly 50 preferably includes coupling the actuator arm 52 to at least one head gimbal assembly 60, for each actuator arm included in the head stack 54, to create the head stack assembly. Manufacturing the head stack assembly may include coupling the head gimbal assembly 60 to the actuator arm 52 of the head stack 54, as shown in FIG. 3. The head stack may include more than one actuator arm. Each of the actuator arms may preferably couple to at least one and in some cases two head gimbal assemblies, as is shown in FIG. 4B. Coupling the head gimbal assemblies to the actuator arms is frequently done using a swaging process. The invention includes the head stack assembly as a product of this manufacturing process.

The invention's hard disk drive 10 includes the invention's head stack assembly 50 mounted through its actuator pivot 58 to a disk base 14. The hard disk drive preferably includes a voice coil motor 30, which further includes the head stack assembly mounted via its actuator pivot to the disk base with the voice coil 32 positioned to move under/between the fixed magnet 34 in response to a voice coil control signal driven by the embedded circuit 500. The head stack assembly is also positioned so that at least one actuator arm 52 can move at least one head gimbal assembly 60 near a disk surface 120-1 as shown in FIGS. 3 and 4A.

A disk surface 120-1 rotates about a spindle 40 to create the rotating disk surface 120-1. The head stack assembly 50 pivots about the actuator pivot 58. The head stack assembly includes the actuator arm 52 coupled with the voice coil 32. When the voice coil is electrically stimulated with a time-varying electrical signal, it inductively interacts with a fixed magnet 34 attached to the voice coil yoke, causing the actuator arm to pivot by lever action through the actuator pivot. Typically, the fixed magnet is composed of two parts, one attached to the voice coil yoke and the other attached to the bottom voice coil yoke. As the actuator arm pivots, the head gimbal assembly 60 is moved across the disk surface 120-1. This provides the coarse positioning of the slider 90, and consequently, the read-write head 100 over a specific track.

Figure 6:
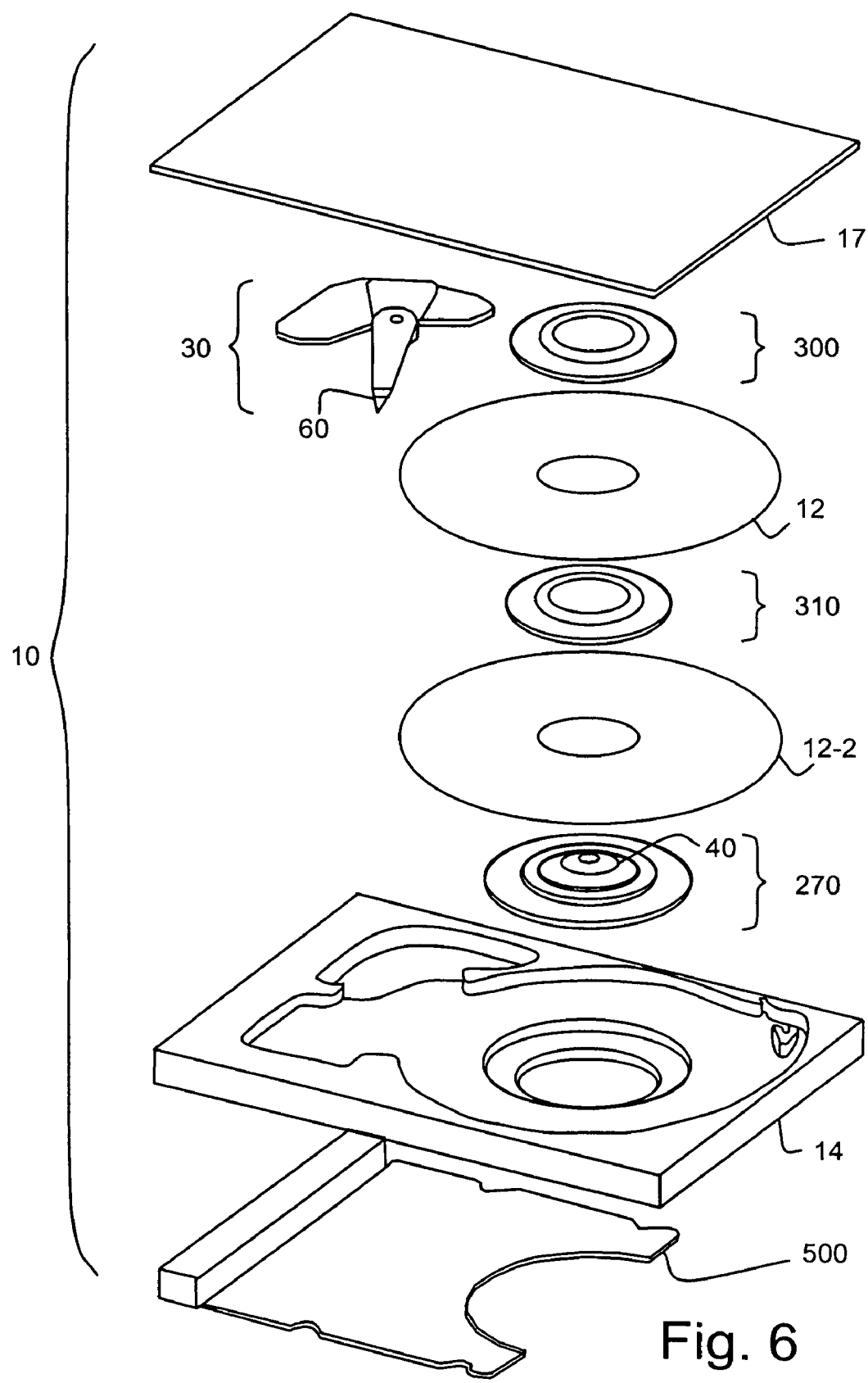
FIG. 6 shows some additional details of the invention's hard disk drive.

FIG. 6 shows an exploded view of the primary components of the hard disk drive 10 including the voice coil motor 30. The hard disk drive further includes a disk base 14 to which the head stack assembly 50 is preferably mounted. The spindle motor 270 preferably drives the disk 12, and consequently the disk surface 120-1 through the spindle 40. The hard disk drive may further include a second rotating disk surface, to which a second actuator arm 52-2 may position a second head gimbal assembly 60-2. An embedded printed circuit board is used to control the positioning of the read-write head 100, possibly by also using a micro-actuator assembly, as well as the coarse positioning through the interactions with the voice coil 32, the fixed magnet 34 and the actuator arm 52 of the head stack assembly 50.

Manufacturing the hard disk drive preferably includes mounting the head stack assembly through its actuator pivot to the disk base to create the hard disk drive. The invention includes the hard disk drive as a product of the invention's manufacturing process.

The preceding embodiments provide examples of the invention and are not meant to constrain the scope of the following claims.

What is claimed is:

1. A hard disk drive, comprising: a disk base;
   a spindle motor mounted on said disk base and rotatably coupled to at least one disk to create at least one rotating disk surface;
   a head stack assembly mounted by an actuator pivot to said disk base,
   with said head stack assembly including a head stack comprising at least one actuator arm coupled to a slider and configured to position said slider near a track on said rotating disk surface,
   with said actuator arm including an actuator notch made from an actuator arm base, a first actuator arm bridge and a second actuator arm bridge,
   and said actuator arm further comprising an island coupling through a mote to at least two members of the group consisting of: said actuator base, said first actuator arm bridge, and said second actuator arm bridge, with said mote not surrounding said island;
   wherein said head stack assembly is configured by said actuator arm to improve dampening of mechanical shock.

2. The actuator arm of claim 1, comprising:
   said actuator notch made from said actuator arm base, said first actuator arm bridge and said second actuator arm bridge;
   said island coupling through said mote through a connected component to at least two members of the group consisting of: said actuator base, said first actuator arm bridge, and said second actuator arm bridge,
   with said island not surrounded by said mote.

3. A method of manufacturing said actuator arm of claim 2, comprising the steps:
   providing said island in an actuator notch between said actuator base, said first actuator arm bridge and said second actuator arm bridge; and
   providing said mote coupling said island to at least two of said members of said group to create said actuator arm.

4. The actuator arm as a product of the process of claim 3.

5. The actuator arm of claim 2, wherein said mote is composed of at least two of said connected components.

6. The actuator arm of claim 5, wherein said island couples through said mote through said connected components to each of said actuator base, said first actuator arm bridge and said second actuator arm bridge.

7. The actuator arm of claim 6, wherein said mote is composed of a single of said connected component.

8. The actuator arm of claim 2, wherein said mote couples said island to at most two of said members of said group.

9. The actuator arm of claim 8, wherein said island couples through said mote to said first actuator arm bridge and said second actuator arm bridge.

10. The head stack of claim 1, including: at least one of said actuator arm.

11. A method of manufacturing said head stack of claim 10, comprising the step:
providing said island coupling through said mote to at least two members of said group to create each of said actuator arms included in said head stack.

12. The method of claim 11, wherein the step providing, further comprises, for each of said actuator arms included in said head stack, the steps:
providing said island in an actuator notch between said actuator base, said first actuator arm bridge and said second actuator arm bridge; and
providing said mote coupling said island to at least two of said members of said group to create said actuator arm.

13. The method of claim 12, wherein the step providing said mote, further comprises the step:
injecting a self-adhesive rubber to create said mote.

14. The method of claim 13, wherein said self-adhesive rubber may includes at least one member of the group consisting of a man-made plastic and a processed natural product.

15. The head stack as a product of the process of claim 12.

16. A head stack assembly, comprising: said head stack of claim 10 coupling to at least one head gimbal assembly, further comprising: said actuator arm coupling to at least one head gimbal assembly.

17. A method of manufacturing said head stack assembly of claim 16, comprising, for each of said actuator arms included in said head stack: coupling at least one head gimbal assembly to said actuator arm to create said head stack assembly.

18. The head stack assembly as a product of the process of claim 17.

19. The head stack of claim 10, further including at least two of said actuator arms.

20. A method of manufacturing said hard disk drive of claim 1, comprising the step:
mounting said head stack assembly by said actuator pivot to said disk base to create said hard disk drive.

21. The hard disk drive as a product of the process of claim 20.

* * * * *